July 21, 1959    W. G. MORING, JR., ET AL    2,895,337
PERMUTATION MEMBER TOOTH DESIGN
Filed Oct. 18, 1956
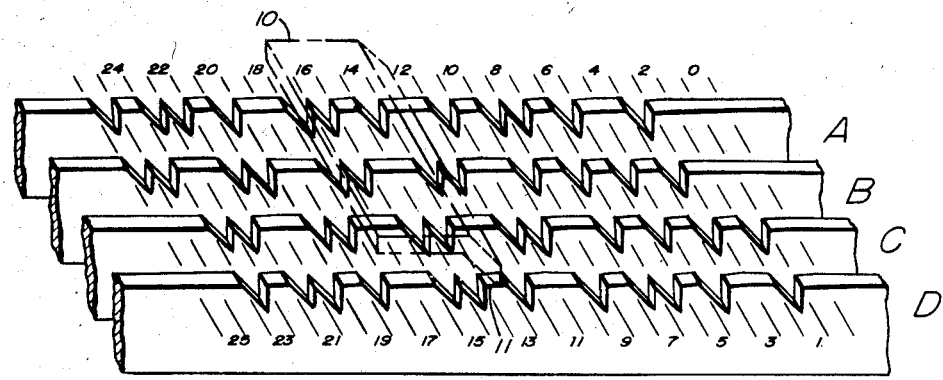
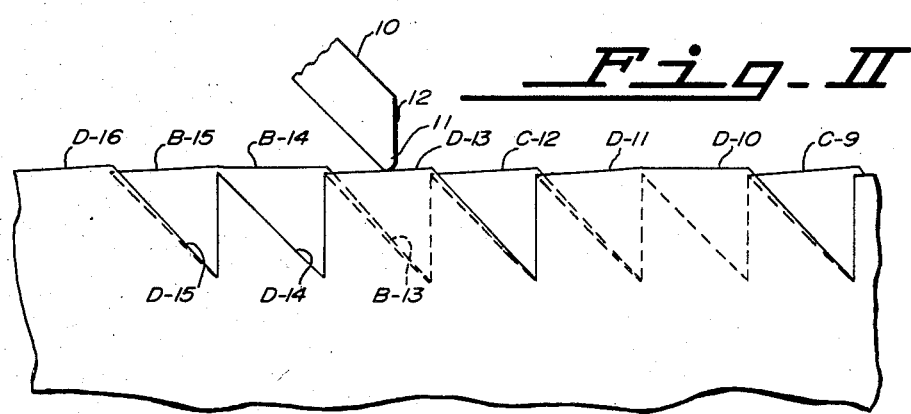
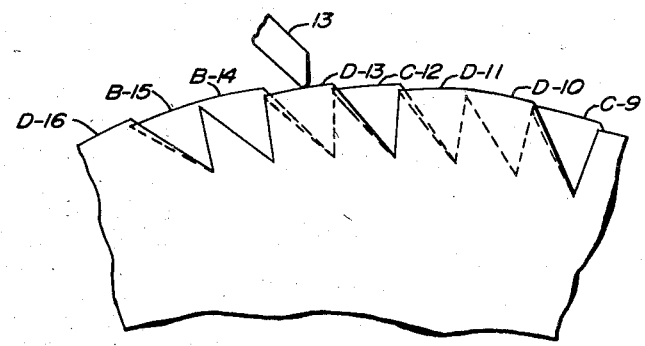
INVENTORS
WALTER G. MORING JR.
GEOFFREY T. GRAY

United States Patent Office 2,895,337
Patented July 21, 1959

---

2,895,337

PERMUTATION MEMBER TOOTH DESIGN

Walter G. Moring, Jr., and Geoffrey T. Gray, Toledo, Ohio, assignors, by mesne assignments, to Toledo Scale Corporation, Toledo, Ohio, a corporation of Ohio Application October 18, 1956, Serial No. 616,851

1 Claim. (Cl. 74—1)

This invention relates to permutation selector devices and in particular to improvements in the shape of the teeth or notches that are used in the permutation devices and sensed by the selecting pawl.

In permutation selector devices such as is shown in United States Patent No. 2,182,001 to John R. Pierce in which a search pawl explores the irregularly notched surfaces of a plurality of permutation members the notched peripheries of the various members of a group or set lie in a common plane or common surface and the search or selecting pawl slides along the same surface. The notches are cut into the permutation members from this surface. If there is any discrepancy or error in the positioning of the members perpendicular to the path of the pawl the sharp corners of some of the notches that are not to be engaged may project into the path of the selecting pawl and be erroneously caught. Thus while such a permutation system as is shown in the patent is operative when all the parts are made to extreme accuracy the system is not commercially practical because of the liability for error as the parts become worn and misaligned.

The principal object of this invention is to provide an improved tooth shape arranged so that a considerable amount of misalignment or wear of the parts may occur before there is any danger of erroneous operation.

Another object of the invention is to provide permutation members with lands between the notches so arranged that the lands of one permutation member will cam a search pawl safely clear of the corners of other notches that are not to be selected in that particular combination of positions of the permutation members.

These and more specific objects and advantages may be obtained in a permutation device constructed according to the invention.

According to the invention the tooth shape of a permutation member which is ordinarily of a saw-tooth configuration with some teeth separated by lands is arranged so that the lands between the separated teeth have elevations higher than the sharp corners of the teeth so that a pawl riding on the lands of one of the permutation members is carried with considerable clearance over the sharp corners of the notches or teeth of the other permutation member or members.

A preferred form of the invention is illustrated in the accompanying drawings.

In the drawings:

Figure I is a diametric view of a set of permutation members indicating the arrangement of the notches in the members and the cooperation of a pawl therewith.

Figure II is an enlarged fragmentary elevation of the set of permutation members showing the shape of the teeth whereby the lands of one permutation member shade or shield the sharp corners of the teeth of the other permutation members.

Figure III is a fragmentary elevation of a set of permutation members arranged for arcuate operation rather than linear operation as shown in Figures I and II.

Referring to Figure I, a set of four permutation bars A, B, C, and D are shown in their neutral or undisturbed position relative to each other and a pawl 10 having a sharp edge 11 in the position shown rests on lands of the A, C, and D bars. Each of the bars A, B, C, and D has a pattern of notches cut into its upper surface, the notches being generally triangular in shape each having a sloping side extending toward the advancing pawl and a sharp or vertical opposite side which serves as a definite stop for the pawl should the pawl find a position in which notches in all four bars are in alignment.

In order to identify the various notches and lands therebetween the active length of each of the bars is divided into 25 units of length or sections. These are numbered from 1 to 25 reading from right to left along the upper portion of the A bar. The various notches and lands are identified in the following description by reference to the bar and the unit space along the bar at which the notch or land is located. Thus the sharp edge 11 of the pawl 10 is shown resting on lands A-13, C-13, and D-13 and supported clear of the notch at B-13.

It may be noted that the notch patterns of bars A and D are similar except for the notches in D being displaced to the right two unit spaces. Likewise the notches in bars B and C are similarly arranged except for the notches in bar C being displaced two units to the right.

When each of the bars is moved according to sensing mechanism that drives the permutation bars it is moved one unit toward the right from the position shown. Thus an aligned notch for engagement by the sharp edge 11 of the pawl 10 may be provided in unit space 3 by operation of permutation bar D so as to align the notches at A3, B3, C3 with the notch D4 which moved in the 3 space as the bar moved.

Other combinations of movements of the permutation bars A, B, C, and D provide different positions for the aligned notch. Thus, an aligned notch may be formed just ahead of the position of the pawl 10 by moving the permutation bars B and D so as to bring the notch at B-12 into the 11 space and to bring the notch D-12 into the 11 space.

If the tops of the lands intermediate the teeth are made precisely level with the tops of the teeth there is danger that the pawl may catch in the wrong position. Thus, for example, if the permutation bar B were, through some error in manufacture, raised slightly from its true position the sharp corner of the notch at B-13 would, in the position shown, be raised high enough to catch the edge of the pawl 10 even though there were lands under the pawl in the other permutation bars. This is the danger that is not corrected in the previous permutation devices and which is corrected by shaping the lands between the notches as illustrated in detail in Figure II. As shown in this figure, the D permutation bar has a land D-16 that leads to a high point as it enters the space 15 and then provides the notches at D-15 and D-14 a point of the tooth between the notches being located a substantial distance below the lands B-15 and B-14 of the B permutation bar. The land B-14 extends to the 13 space and thus cams the sharp edge 11 of the pawl 10 high enough so that it cannot possibly catch on the corner of the land D-13 adjacent the notch D-14. As the pawl 10 moves from left to right across the section illustrated in Figure II it is carried first on the land D-16, then transfers to the land B-15 riding on that land across it and the land B-14 and then dropping off the corner of the land B-14 onto the land D-13 where it is shown. From this point as it continues on it transfers to the land C-12 then to the land D-11—D-10 and then finally leaves the particular section riding on the land C-9. At each transfer from one land to another it takes a slight downward motion as if it were going to enter the next notch and then is caught on the land and again raised to the level of the flat portions of the lands, such as the lands B-14 or D-10. Where a land extends the width of two notches such as the land B-15—B-14 the first section traversed by the pawl is inclined slightly with respect to the path of the pawl so as to raise the pawl away from the tips of the teeth. The second section is parallel to the general path of travel since the pawl has already been raised to its maximum elevation. If the land extends only a distance of one unit of travel, such as the land D-13, it starts at the lower level even with the tips of the teeth and then rises at a uniform rate until it reaches a high or crest at the opposite side of the space just prior to entering the next notch.

The height of the high part of each land is arranged to be higher than the tips of the teeth by an amount that is larger than the maximum misalignment that may occur from manufacturing errors and wear in the parts. Thus regardless of how the clearances are taken up in the device and the amount of wear the sharp edge 11 of the pawl 10 can never engage the sharp corner of a tooth when there are lands on the other bars in the same unit space.

If the permutation bars A, B, C, and D are positioned relative to each other so that there is an aligned notch the pawl 10 as it rides over the lands immediately preceding the aligned notch starts downward as if it were going to transfer from one land to another and then continues downwardly into the aligned notch and is arrested with its vertical face 12 in contact with the sharp or vertical side of one of the notches in each permutation bar.

It is immaterial in the operation of the permutation device whether the corners of the lands adjacent the sharp sides of the notches be rounded or not so long as the top surface of each of the lands starts at a point below the level of the lands in the adjacent bars. The particular configuration was adopted so that the pawl 10 would have a minimum of acceleration or force tending to drive it away from the permutation members and thus it would ride easily into the notches without requiring excessive spring force to drive it into the notches.

While the permutation bars A, B, C, and D are shown in Figure I as straight bars movable along their length, the improved tooth shape may also be employed with permutation disks, that is members with notches arranged along the periphery of a generally circular or sector shaped member. Such an arrangement is illustrated in Figure III. Again the tooth shape of the lands between the notches is arranged to start at an elevation or a radius that is well below the normal path of the edge of a cooperating pawl 13. Each land raises or increases in radius as it approaches the trailing end of each land or the junction between the land and the sloping side of the following notch so that it is impossible for the pawl when riding on one land to engage a notch of another member.

A general characteristic common to the shapes of the teeth or lands shown in the various figures is that each land has a slope relative to the general path of travel of the pawl that is opposite to the slope of the slanted sides of the notches and that is at an elevation such that the entering side of the notch is raised above the exit or sharp corner of a notch.

Various modifications may be made in the precise detail of shaping the teeth and the lands between the teeth of a permutation selecting device without departing from the scope of the invention wherein the sharp corners are located well out of the path of the cooperating pawl.

Having described the invention, we claim:

In a permutation selecting device, a plurality of parallelly aligned notched permutation members, a search member adapted for movement in a given direction over said permutation members in search of aligned notches, each permutation member having a notch with an entering face gradually descending into said member in said given direction to intersect an ascending abutment face substantially perpendicular to said given direction, said notches on said permutation members being arranged in a pattern, and a land on each member adjacent each notch in said given direction not immediately followed by another notch, said land ascending from the crest of said abutment face in said given direction.

References Cited in the file of this patent

UNITED STATES PATENTS

| 855,039 | Baron | May 28, 1907 |
| 2,680,379 | Duquenne | June 8, 1954 |

FOREIGN PATENTS

| 58,794 | France | Nov. 25, 1953 |
| 534,486 | France | Jan. 6, 1922 |
| 723,460 | Great Britain | Feb. 9, 1955 |